June 30, 1964 J. S. BAWCOM ETAL 3,139,115
LINED VACUUM BELLOWS
Filed March 18, 1963
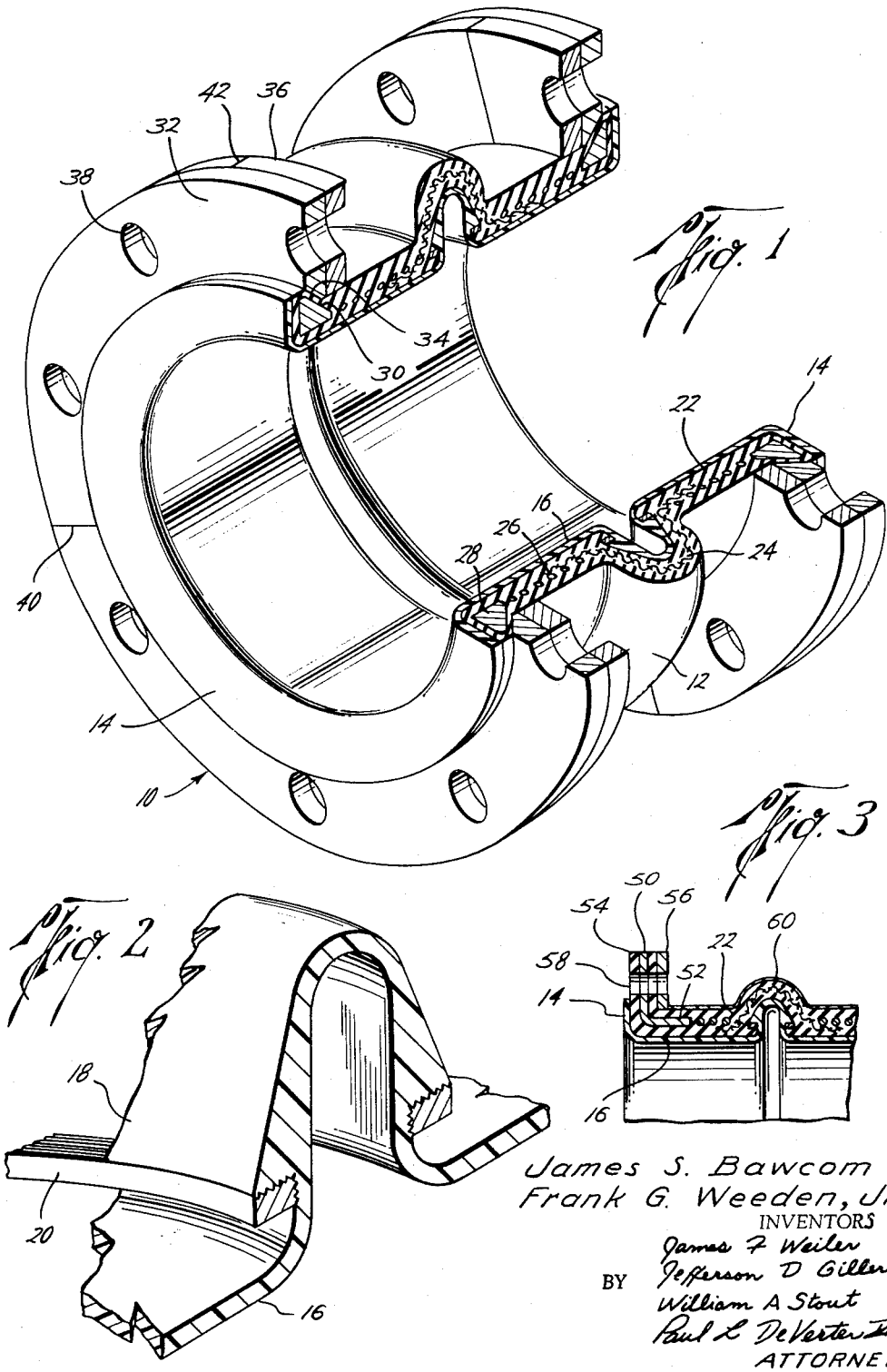
James S. Bawcom
Frank G. Weeden, Jr.
INVENTORS
James F. Weiler
Jefferson D. Giller
William A. Stout
Paul L. DeVerter II
ATTORNEYS

United States Patent Office 3,139,115
Patented June 30, 1964

3,139,115
LINED VACUUM BELLOWS
James S. Bawcom and Frank G. Weeden, Jr., Houston, Tex., assignors to John L. Doré Co., Houston, Tex., a corporation of Texas
Filed Mar. 18, 1963, Ser. No. 265,630
12 Claims. (Cl. 138—121)

The present invention relates to an improvement in lined vacuum bellows, and more specifically relates to a fluorocarbon lined reinforced vacuum bellows especially suitable for use with a contaminatable or corrosive fluid at full vacuum.

Expansion joints or bellows are used to provide a flexible coupling between conduits in order to compensate for expansion and contraction of the conduits, as well as to absorb vibration and movement of the conduits and related equipment.

The prior uses and construction of such expansion joints are adequately displayed in the patents to Fraley, No. 1,696,435; Jones, No. 2,692,782; and Hammond, No. 2,879,804.

The present invention is directed to an improved vacuum bellows, which may also be used as an expansion joint at low pressures which is particularly useful with corrosive fluids where a fluorocarbon material performs efficiently. Although the terminology vacuum bellows is used throughout, it should be understood that the principal difference, as well as the critical difference, between vacuum bellows and expansion joints is that expansion joints are typically considered for use with internal pressures greater than atmospheric, whereas vacuum bellows are typically used with vacuum where the atmospheric pressure is greater than the fluid pressure. Although most vacuum bellows are capable of some used in either situation, expansion joints are rarely capable of use in the latter situation.

With the discovery of the fluorocarbon materials such as polytetrafluoroethylene (Teflon) and trifluorochloroethylene (Kel-F), it became readily apparent that these materials were extremely valuable for lining pipe and other conduits for particular use with corrosive fluids, such as strong acids and alkalines. While the chemical properties of such fluorocarbon materials are entirely satisfactory for use as vacuum bellows or expansion joints, the mechanical properties and fabricating techniques have been slow to develop. The simple placement of a fluorocarbon liner within the expansion joints of the prior art, such as those mentioned above, has been found to result in a device which is adequate for pressure service, but is not acceptable for vacuum service, because the liner tends to pull away from the flexible covering, and soon breaks, thus destroying the joint.

The present invention is directed to a vacuum bellows which is capable of standing a full vacuum (i.e. 30 in. of mercury) at temperatures from $-322°$ F. to $500°$ F. Further, during this service, the present invention is capable of compensating for axial, angular, lateral, combined and cosmos movements of the abutting conduits. To withstand the stress and strain involved in such a situation, the present invention utilizes endless annular bands to maintain the original shape of the convolution, as well as providing an adherent surface for the fluorocarbon liner to prevent its being parted from the flexible cover. Additionally, the present invention provides wire rings for strength along the straight section of the bellows, wire cloth for strength over the convolution, flange support means to insure adequaate seating and sealing with the connecting conduits, and the present invention may be provided with an outer fluorocarbon covering for corrosive external invironments. Further, no contaminating surfaces exist within the liner, so that the entire inner surface of the bellows is inert.

Therefore, it is an object of the present invention to provide a vacuum bellows with the foregoing features and advantages.

Yet another object of the present invention is to provide a flexible reinforced lined vacuum bellows which includes a convolution and wherein the convolution liner is radially supported against external pressure by means of endless annular bands.

Yet another object of the present invention is to provide radial support for the convolution liner which will not be dislodged upon expansion and contraction or other movement of the bellows during service.

A still further object of the present invention is to provide a flexible reinforced vacuum bellows which has a fluorocarbon liner and to which liner is bonded a flexible outer covering extending from flange to flange.

Another object of the present invention is to provide a flexible reinforced vacuum bellows having a fluorocarbon liner with a flexible covering bonded thereto, which liner includes support means along the cylindrical length to overcome the effects of external pressure.

Yet another object of the present invention is to provide a fluorocarbon lined vacuum bellows having novel sealing means in the flange area for transmitting the compression forces to all parts of the liner, thereby insuring perfect seating with the conduit.

Yet another object of the present invention is to provide a fluorocarbon lined vacuum bellows having a flexible covering, the combination of which is usable at a full vacuum with temperature ranges up to $500°$ F.

Other and further objects, features and advantages will be apparent from the following description of the presently preferred embodiment of the invention given for the purpose of disclosure, taken in conjunction with the accompanying drawings, where like character references designate like parts throughout the several views, and where:

FIGURE 1 is a cut away perspective view of the vacuum bellows of the present invention, FIGURE 2 is a partial perspective view of the portion of the vacuum bellows taken in the region of the convolution, and particularly showing the manner of securing the reinforcing bands to the liner, and FIGURE 3 is a partial sectional view at the flange area of a modification.

Generally, the present invention comprises a fluorocarbon liner which is completely inert to the fluid carried and is radially supported against full vacuum pressures by means of reinforcing bands in the area of the convolution, as well as by means of wire rings along the outer length, which wire rings are joined to the fluorocarbon liner by means of an adherent flexible covering.

Referring now to the drawings, and particularly to FIGURE 1, the reference numeral 10 generally designates a vacuum bellows which includes a convolution 12 situated approximately intermediate the flanges 14 on either end of the bellows 10. Extending from flange to flange and in the convolution 12 is a liner 16. This liner is constructed of fluorocarbon material, and it is presently preferred that this material be Teflon. In the practice of the present invention, it is further preferred that the fluorocarbon liner 16 be machined from a single billet of fluorocarbon, rather than being cast or molded to shape. The reason for machining the fluorocarbon liner 16 is to prevent any orientation of the molecular structure of the liner, therefore providing equal strength in all directions along with chemical inertness and imperviousness.

At the convolution 12, which generally comprises a radially outwardly extending U-shaped area, it is to be noted that a shoulder 18 extends axially from either side of the convolution 12, of the liner 16.

After fabricating by machining, the liner 16, with flanges 14 and convolution 12, as well as shoulder 18, the outer surface of the liner 16 is treated so that it will be receptive to an adhesive. The typical fluorocarbon materials are impervious and unaffected by most ordinary chemicals. However, is is now known that such fluorocarbon materials may be etched so that they will be receptive to an adhesive. The etching procedure generally comprises emersing the fluorocarbon material into a solution of anhydrous ammonia and sodium for a predetermined length of time. In the present instance, it has been found that approximately five minutes is sufficient to etch the surface of the liner 16, the efficacy and degree of etching usually being determined by a change in surface color of the fluorocarbon material. With the foregoing solution, it is found that in about five minutes time the outer surface of the fluorocarbon liner 16 has turned a brownish color, which indicates that the etching has proceeded sufficiently. Thereupon, the liner 16 is removed from the etching solution and neutralized in water.

Surface etching of fluorocarbons, such as Teflon, apparently effects no other chemical property, other than making possible the adherence of an adhesive to the etched surface. Since it is unnecessary that the inside of the fluorocarbon liner 16 be similarly etched, and to prevent the wasteful exploitation of the etching solution, the inner surface of the liner 16 is generally protected by covering the flanges 14 with masking tape, or by spraying the inside of the liner 16 with vinyl paint to prevent the etching solution from attacking that surface.

Referring now to FIGURE 2, where an enlarged portion of the convolution 12 of liner 16 is shown, it is to be noted that the under serrations extend about the convolution 12 liner 16 adjacent the shoulder 18. These serrations are machined on the outer surface of the liner 16. Mating with the shoulder 18 is an annular band 20 which extends about the liner 16 and which pushes radially outwardly against the shoulder 18. The outer surface of the annular band 20 is serrated to mate with the serrations of the shoulder 18, as well as the serrations on either side of the convolution 12 of the liner 16. The function of the serrations on both the shoulder 18 and annular band 20 is to retain the annular band in place. As is well known in the bellows art, the function of the convolution 12 is to provide for axial and lateral movement of the flanges 14 with respect to each other. However, in vacuum bellows, it is necessary that the convolution 12 be supported to prevent its being sucked inwardly by the vacuum. The present invention provides for the foregoing contingency by providing a serrated shoulder 18 and a serrated annular band 20 to maintain the diameter of the bellows 10 and therefore the convolution 12 against the vacuum pressures encountered. Since the purpose of the convolution 12 is to provide for axial and lateral movement of the flanges 14 it is apparent that a means for retaining the annular band in place and adjacent to the convolution 12 must be provided. The provision of serrations on both the shoulder 18 and the annular band 20 perform this function.

The annular band 20 is preferably made of steel with a generally rectangular cross section. To install the annular band 20 so that it presses radially outwardly on the shoulder 18, it is necessary that it first be manipulated over the flanges 14. This is accomplished by cutting the annular band 20 so that it may be expanded enough to insert the band 20 over the flanges 14, and thereupon the annular band 20 ends are butt welded together, so as to again provide a continuous annular band 20. After the annular band 20 has been welded into an integral member, it is inserted under the shoulder 18 of the liner 16, and is retained in that position by means of the serrations shown, in spite of axial and lateral movement of the flanges 14. Further, the annular band 20 provides considerable radial strength to the liner 16 in the area of the convolution 12.

After the annular bands 20 have been implaced to radially strengthen the convolution 12 of the liner 16, the outer surface of the liner 16 is built up with a flexible covering 22. The flexible covering generally comprises laminations of impregnated fabric or cloth with intermediate layers of a flexible material, such as a form of rubber. The laminations are not shown in the drawings as they are conventional and would obscure other details. The particular makeup of the flexible covering is generally determined by the environmental temperature anticipated for the finished vacuum bellows 10. For example, if the maximum desired temperature for the vacuum bellows 10 is approximately 250° F., then the flexible covering 22 is generally made up of laminations of neoprene and canvas duck. On the other hand, if the temperature range anticipated is approximately 325° F. then the flexible covering 22 is made up of laminations of butyl and Dacron fabric. If still higher temperatures are anticipated for the vacuum bellows 10 then the flexible covering 22 may be made up of silicone rubber and woven glass cloth. The function of any of these flexible coverings 22 is to protect the liner 16 from mechanical damage, as well as to provide additional strength with flexibility, to the vacuum bellows 10.

To install the flexible covering 22, the etched outer surface of the fluorocarbon liner 16 is first coated with an appropriate adhesive, such as commercial neoprene adhesive, and thereupon a thin layer of neoprene is applied to the outer surface of the liner 16, followed by a thin layer of impregnated fabric. This lamination is continued from flange 14 to flange 14 over the entire outer surface of the fluorocarbon liner 16 until the layer had been built up to approximately the diameter of the emplaced annular band 20, which is likewise buried beneath the flexible covering 22.

Thereupon, wire cloth is placed over the partially built up flexible covering 22 in the area of the convolution 12. The wire cloth 24 generally comprises a conventional screen woven wire and extends from the convolution 12 toward either flange 14 approximately the radial distance of the convolution 12. The function of the wire cloth 24 is to provide additional mechanical strength to the vacuum bellows 10 in the area of the convolution 12.

Thereupon, wire rings are placed about the straight portions of the vacuum bellows 10 between the convolution 12 and the flange 14. The wire rings 26 may generally comprise a helical spring or a series of independent annular rings. The function of the wire rings 26 is to provide mechanical strength for the vacuum bellows 10 in the area between the flanges 14 and the convolution 12. If the wire rings 26 comprise independent annular rings, then they may be constructed in a manner similar to that described to the annular band 20. Thus, independent wire rings 26 may be split and placed about the liner 16, whereupon the ends are butt welded together. On the other hand, if the wire rings 26 comprise a single elongate helix, then the helix may be threaded over the flange 14 so that the wire rings are placed between convolution 12 and the flange 14.

Mounted at either end of the vacuum bellows 10, adjacent the flanges 14 are flange support means. The function of the flange support means is to provide a method for pressing the flanges 14 of liner 16 against the adjacent conduits. Under severe environmental conditions, it is imperative that fluorocarbon flange 14 seat properly against the adjacent conduits, consequently the flange support means must be capable of distributing the stress involved over the entire flange 14 area. Referring again to FIGURE 1, such a flange support means is shown.

Adjacent the flanges 14, and inwardly spaced therefrom by several laminations of flexible covering 22, are delta rings 28. The delta rings comprise large steel annular rings having a generally right triangular cross section. The right angle of the delta ring 28 is adjacent to the intersection of the flange 14 and cylindrical portion of the liner 16. Opposite the right angle of the right triangular cross section of the delta ring 28 is the hypotenuse 30 which may be set at 45° angle with respect to the cylindrical portion of the liner 16. The hypotenuse 30 generally faces toward the outer edge of the convolution 12. As with the annular band 20, the delta ring 28 is split after fabrication, and placed over the flange 14 and adjacent its back side, whereupon the ends of the split delta ring are butt welded together, thus forming an integral delta ring. The purpose of the hypotenuse of the triangular cross section of the delta ring will be explained further hereinafter.

After each of the foregoing components, namely the delta ring 28, wire rings 26, wire cloth 24, and the annular band 20 have been emplaced as described, additional layers of flexible covering 22 are placed upon the outer surface of the liner 16. As before, between each layer of the laminations of the flexible covering 22 additional adhesive is applied to bond the various laminations together. Thereupon, the partially completed vacuum bellows 10 is baked in an oven, or otherwise chemically treated so as to cure the various layers of neoprene, fabric, adhesive, and etched liner together to form an integral protective and strengthing cover.

To complete the vacuum belows 10, end rings are placed behind the flanges 14. The outer end ring 32, as seen in FIGURE 1, comprises two semi-circular rings, or a pair of split rings, so that it may be placed behind the flange 14. The surface of the outer end ring 32 which is adjacent the flange 14 is beveled to match the angle of the hypotenuse 30 of the delta ring 28. This beveled surface 34 is utilized to transmit bolting pressure from the end ring 32 through the beveled surface 34 to the hypotenuse 30 of the delta ring and therefrom to the flange 14, thus insuring adequate sealing.

Mounted behind the outer end ring 32 is a second end ring 36 which also consists of a pair of split semi-circular rings. Passing through both the inner and outer end rings 32 and 36 are bolt holes 38 through which fastening means may be utilized to attach the vacuum bellows 10 to an appropriate conduit. The bolt holes 38 mate or line up in both the outer end rings 32 and inner end ring 36, while the split between the segments of the two end rings are arranged at different points. This is illustrated in FIGURE 1 by the split 40 in the outer end ring 32 and the split 42 in the inner end ring 36. By offsetting the splits 40 and 42, when bolts are passed through the bolt holes 38, the end rings 32 and 36 act as an integral unit.

Advantageously, therefore it is seen that the present invention provides a lined vacuum bellows whose entire conduit surface is inert fluorocarbon and which has great strength in the area of the convolution due to the inclusion of the annular bands 20. Further, the strength of the entire vacuum bellows 10 is greatly enhanced by the etching and adhering to the outer surface of the fluorocarbon liner 16 of the flexible covering 22. If the outer surface of the fluorocarbon liner 16 is not etched and adhered to the flexible covering 22, then the mere inclusion of wire rings 26 in the flexible covering 22 does not prevent the liner 16 from separating from the flexible covering 22 when full vacuum is applied to the vacuum bellows 10. As was previously mentioned, with a choice of lamination materials for the flexible covering 22, vacuum bellows according to the present invention have been successfully utilized at full vacuum (i.e. 30 in. mercury) and at temperatures of 450° F. Further, the method of supporting the convolution 12 against external pressure remains strong and yet flexible so that axial, lateral, angular, and cosmos movements may be compensated for. Because of the particular construction techniques hereinbefore described, bellows made according to the present invention need not be specified for any maximum vacuum, but instead need only be specified as to the temperatures involved. It is to be understood that nominal positive pressures may likewise be carried by the vacuum bellows of the present invention, but that is not the primary function of the present invention.

The inclusion of the delta rings 28 adjacent the flanges 14 of the vacuum bellows 10 provides an expeditious manner for the safe and proper seating of the liner 16, flange 14 against adjacent conduits. Due to the inclusion of the beveled surface 34 and hypotenuse 30 of the delta ring 28, the bolt pressure from the various bolt holes 38 is distributed completely about the flange 14 so that perfect seating results, without attendant cocking or distortion of the flange 14.

Referring now to FIGURE 3, a modification of the flange support means is shown. In this instance, the delta ring has been replaced with an upset ring 50. The upset ring 50 generally comprises a cylindrical portion 52 which is of larger diameter than the cylindrical portion of the liner 16, and an upset portion 54 which is parallel to the flange 14 or the liner 16. An upset ring 20 is buried within the flexible covering 22 just as was the delta ring 28. When the upset ring 50 is utilized in place of the delta rings 28, it is only necessary to include a single split end ring 56 in place of the pair of end rings 32 and 36. Both the flexible covering 22, upset ring 59 and end ring 56 are provided with mating bolt holes 58 so that fastening devices such as nuts and bolts may be applied therethrough. In this instance, bolt pressure applied by a bolt head adjacent the bolt hole 58 and on the back of the ring 56 is applied through the flexible covering 22 to the upset ring 50 and thence to the back of the liner 16, flange 14 so that seating with mating conduits is assured. Again, the provision of etching the outer surface of the fluorocarbon liner 16 so that this liner 16 is firmly bonded or adhered to the flexible covering 22 prevents the entrance of environmental air or fluids between the liner 16 and the covering 22 thereby preventing the liner 16 from caving in or pulling out in full vacuum service.

In some types of service, the vacuum bellows 10 with its flexible covering 22 may be attacked by the particular environment. In this situation, it is, of course, feasible to coat the outer surface of the flexible covering 22 with an appropriate medium. Such a medium may be aluminum paint, Teflon tape, silicone grease, or the like. To adhere the Teflon tape 60 type of outer covering (seen in FIGURE 3) over the flexible covering 22, it will, of course, be necessary to appropriately etch the Teflon tape 60 so that it may be appropriately glued to the flexible covering 22. The etching proceduce is similar to that previously described with reference to the liner 16, and it is apparent that this tape 60 may be added to either embodiment.

Finally, it is to be particularly noted that the present invention utilizes all of the vacuum support means outside of the inside surface of the fluorocarbon liner, so that the fluid carried in full vacuum service is not contaminated.

It is understood that more than one convolution may be utilized in the utilization of the present invention, so long as the requirements of bonding the fluorocarbon liner to the flexible covering and the annular band requirements are met.

The present invention, therefore, is well adapted to carry out the objects and attain the ends and advantages mentioned as well as others inherent therein. While presently preferred embodiments of the invention have been given for the purpose of disclosure, numerous changes in the details of construction, and the combination, shape, size, arrangement of parts and uses may be resorted to without departing from the spirit or the scope of the invention as hereinafter claimed.

What is claimed is:

1. A flexible reinforced vacuum bellows including:

an elongate unoriented fluorocarbon liner,
said liner including radially outwardly extending flanges, and at least one radially outwardly extending convolution between the flanges,
the outer surface of the liner including a shoulder extending axially from the side of the convolution,
the inward and convolution surface of the shoulder being serrated,
an annular band mounted adjacent the convolution and radially engaging the liner shoulder,
the surface of the band being serrated and mating with the shoulder serrations,
the outer surface of the fluorocarbon liner being receptive to an adhesive,
a flexible covering surrounding the outer surface of the liner, said covering extending from flange to flange,
the flexible covering comprising bonded laminations of rubber and fabric,
a plurality of wire rings embedded in the covering between the flanges and the convolution,
wire cloth embedded in the covering and extending from beneath the wire rings over the convolution,
flange support means embedded in the flexible covering adjacent each flange, and
an adhesive bonding the laminated flexible covering and the liner, thereby forming an integral bellows.

2. The invention of claim 1 including an outer covering of fluorocarbon tape bonded to the flexible covering.

3. The invention of claim 1 wherein the flange support means comprises:
a delta ring embedded in the covering adjacent each flange,
the delta ring having substantially a right triangular cross section with the hypotenuse facing the convolution,
a first end ring mounted about the covering and adjacent each flange,
the first ring having a beveled surface mating with the delta ring,
a second end ring mounted about the flexible covering adjacent the first end ring, and
each of the end rings having alined bolt holes passing therethrough.

4. The invention of claim 1 wherein the flange support means includes:
an upset ring embedded in the flexible covering adjacent each liner flange,
the upset ring including a radially outwardly extending portion parallel to and of greater diameter than the liner flange,
an end ring mounted about the flexible covering adjacent each flange, and
bolt holes passing through the flexible covering, upset ring and end ring.

5. The improvement in a flexible reinforced vacuum bellows having a radially outwardly extending U-shaped convolution of,
a fluorocarbon liner,
the outer surface of the liner being receptive to an adhesive,
a shoulder extending axially from the outer surface of the liner and convolution,
an annular band pressing radially outwardly against the shoulder,
a flexible reinforced covering over the outer surface of the liner and enclosing the convolution, shoulder and band, and
an adhesive bonding the flexible covering to the fluorocarbon liner.

6. The improvement in a flexible reinforced vacuum bellows having a radially outwardly extending U-shaped convolution of:
an integral liner,
a shoulder extending axially from the outer surface of the liner at the convolution, and
an annular band pressing radially outwardly against the shoulder.

7. The invention of claim 6 wherein:
the inward surface of the shoulder includes serrations, and
the annular band includes serrations mating with the shoulder serrations.

8. The invention of claim 6 including:
the liner being fluorocarbon,
the liner having an outer surface receptive to an adhesive,
a flexible reinforced covering over the outer surface of the liner, and
an adhesive bonding the liner to the covering.

9. A vacuum bellows including:
an elongate fluorocarbon liner,
integral flanges extending radially from either end of said liner,
at least one generally U-shaped integral convolution extending radially from said liner from said flanges,
a shoulder extending axially from the outer surface of the liner at the convolution,
the outer surface of the liner being receptive to an adhesive,
an annular band pressing outwardly against the liner shoulder,
a flexible covering adhesively bonded to and enclosing the outer surface of the liner and annular band,
wire cloth embedded in the flexible covering over the convolution, and
wire rings embedded in the flexible covering extending substantially from the flanges to over the wire cloth.

10. The invention of claim 9 wherein the fluorocarbon liner is unoriented and machined to shape.

11. The invention of claim 9 wherein the flexible covering comprises bonded laminations of rubber and fabric.

12. The invention of claim 9 including flange support means embedded in the flexible covering.

References Cited in the file of this patent
UNITED STATES PATENTS
2,953,618    Buono et al. _____ Sept. 20, 1960
FOREIGN PATENTS
23,638    Germany _____ Sept. 7, 1962